United States Patent [19]

Adams

[11] 4,269,022
[45] May 26, 1981

[54] DEVICE FOR HARVESTING GRAPES OR OTHER BERRIES AND APPARATUS PROVIDED WITH THIS DEVICE

[76] Inventor: Albert Adams, Domaine de St. Aubin 34170, Lespignan, France

[21] Appl. No.: 30,884

[22] Filed: Apr. 17, 1979

[30] Foreign Application Priority Data

Apr. 19, 1978 [FR] France .............................. 78 12860

[51] Int. Cl.³ ........................................... A01D 46/00
[52] U.S. Cl. ..................................... 56/330; 100/121
[58] Field of Search ........................... 56/330; 171/58; 100/121; 99/503, 513

[56] References Cited

U.S. PATENT DOCUMENTS

| | | | |
|---|---|---|---|
| 695,585 | 3/1902 | Stanley | 100/121 |
| 1,355,101 | 10/1920 | Winchester et al. | 100/121 |
| 3,344,591 | 10/1967 | Christie et al. | 56/330 |
| 3,420,046 | 1/1969 | Johnson et al. | 56/330 |
| 3,468,242 | 9/1969 | Schaffrath | 100/121 |
| 3,527,668 | 9/1970 | Kusters et al. | 100/121 |
| 3,603,122 | 9/1971 | Sulzmann | 100/121 |
| 3,616,630 | 11/1971 | Gray et al. | 56/330 |
| 3,730,443 | 5/1973 | Johnson | 56/330 |
| 3,774,528 | 11/1973 | Rewhall | 100/121 |
| 3,889,454 | 6/1975 | Bruel | 56/330 |

FOREIGN PATENT DOCUMENTS

| | | | |
|---|---|---|---|
| 2738669 | 3/1978 | Fed. Rep. of Germany | 56/330 |
| 2709915 | 9/1978 | Fed. Rep. of Germany | 100/121 |
| 2294627 | 8/1976 | France | 56/330 |
| 419203 | 9/1974 | U.S.S.R. | 56/330 |

*Primary Examiner*—Paul J. Hirsch
*Attorney, Agent, or Firm*—Sandler & Greenblum

[57] ABSTRACT

A device for harvesting grapes or other berries having a plurality of hollow cylindrical wheels. Each of the wheels in turn has a wide tire having a rectilinear perforated circumference. The tires are maintained at reduced pressure by connection to a storage reservoir which is maintained under vacuum. The cylindrical wheels serve as presses and are arranged in pairs along two parallel vertical axes. The wheels are maintained in contact by springs which assure the pressure necessary to burst the berries or grapes which pass between the cylinders. After bursting, the fruit is drawn across and through the perforations of the cylinders and is conducted towards the storage reservoir. The device can further be utilized for harvesting other types of fruits.

19 Claims, 7 Drawing Figures

DEVICE FOR HARVESTING GRAPES OR OTHER BERRIES AND APPARATUS PROVIDED WITH THIS DEVICE

BACKGROUND OF THE INVENTION

1. Field of the Invention

The present invention has as an object a harvester for grapes or other berries which can be adapted to use with an agricultural device such as a tractor, or even preferably to a treatment device, this apparatus itself comprising a container which can be placed under reduced pressure and a pump which is normally used to evacuate the said container, and all other elements which may serve useful functions in the present case. The device of the invention alternately having the form of an independent motorized vehicle which is specifically constructed for this purpose.

2. Description of Prior Art

Known grape harvesters are generally constituted by automotive vehicles which comprise thresher type elements whose function it is to impart a vibrational movement to the vines which is relatively rapid and of low amplitude, so as to cause the grapes carried on the vine to fall into retractable scales arranged at the base of the apparatus which successively surround each base of the grape vine stalk and from which the grapes are directd by diverse means (conveyor or bucket chain) towards a container carried by the vehicle itself or which follows in close proximity thereto. Diverse devices such as mechanical or pneumatic sorters complete the system for purposes of removing leaves collected by the machine.

Such devices, which are bulky, heavy and expensive and difficult to maneuver, present numerous inconveniences. The sheets of oscillating beaters, which circulate on both sides of the vine and which shake it, damage a large quantity of grapes, resulting in a harvest which is signficantly damaged, and which is strongly susceptible to oxidation during subsequent transportation. For the same reason that a substantial flow of juice is caused, a not unsubstantial portion of which impregnates the vegetation remaining on the ground, which is completely lost, and another portion falls on the ground causing yet further loss.

Furthermore the shaking imparted to the vines detach many leaves therefrom which contaminate the harvest. They also cause numerous vine shoots and even more important parts of the vegetation to be torn off. They also damage the solidity of the spikes or supports which support the vine. They also damage future harvests by injuring the buds of the following year because of the shocks to which they are subjected.

Other known devices, of a different type, rely upon a strong pneumatic vacuum to detach the grapes and to draw them through one or several aspiration sleeves into a receptacle container generally carried by the apparatus itself.

Such devices have the inconvenience of a total absence of automation, the worker having to direct the suction orifice in front of each of the clusters to be harvested. Furthermore the large air flow necessary to create a vacuum sufficient to remove the grapes without mechanical means and to pull them into pipes results in a very substantial oxidation of the product, which further finds itself highly lacerated by its high speed of movement. Finally the process also results in numerous leaves being torn off, which further detracts from the quality of the harvest.

SUMMARY OF THE INVENTION

The device forming the object of the present invention makes it possible to overcome these inconveniences. In effect, in the device of the invention the vine is not beaten. It is thus protected against waste. For this to be done the vine is taken along the entire height of the vegetation between two perforated elements which are simultaneously applied against the vegetation while moving at the speed of the vehicle which tows them, without the pressure being exercised on the vine being able to deteriorate the vegetation; these elements have perforations such that grapes of all sizes can freely pass across them without any leaves being entrained therein.

The vehicle of the invention is designed in a very simple fashion and can be drawn by an agricultural tractor or preferably by an automotive treatment vehicle which itself comprises a reservoir and an extraction pump for the product contained in the reservoir. The apparatus forming the object of the invention is thus reduced to only the elements necessary for the harvest of the fruits and is as a result light, manageable and less costly, which renders it useful in small and medium agricultural enterprises which could not normally consider the purchase of known materials, as much because of their own cost as because of their size, which prohibits their use without substantial modification of the structure of the vineyards.

BRIEF DESCRIPTION OF THE DRAWINGS

The attached drawings, given by way of example only, show the possible embodiments for realizing the objects of the present invention.

DETAILED DESCRIPTION OF THE DRAWINGS

As shown (FIG. 1), the device comprises a perforated surface 1 which is arranged on both sides of the vine 2 and which squeezes it under the effect of springs, without exerting a pressure on it capable of deteriorating vegetation that the vehicle encounters. In order to facilitate movement of the perforated surface along the vegetation, or reciprocally to facilitate the movement of the vegetation between these two perforated surfaces 1, the surfaces are provided at the periphery of a hollow wheel. The wheels are arranged in the form of a supple elastomeric alimentaire tire provided with a synthetic or metallic sheet reinforcement and which has perforations along its tread capable of being traversed by the grapes encountered, whatever their size. By "alimentaire" is meant that the tire material is suitable for use in the treatment of foods.

Figure 1:
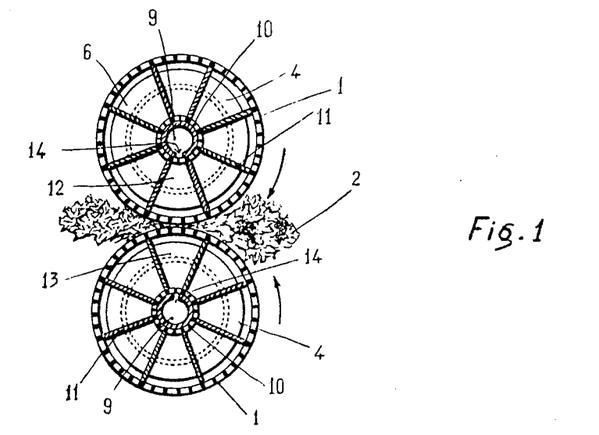
FIG. 1 is a schematic view in horizontal cross-section of the principle harvester device.

The supple tire which comprises a tire bead 3, in the fashion of the air tube of a car, is mounted on two cheek plates 4 and 5 which form the rim of the wheel thus constructed. This supple tire 1 is maintained stretched and integral with the cheek plates 4 and 5 by means of two inflatable, supple and elastic toruses such as air bladders 6 and 7, each of which is mounted on one of the cheek plates 4 and 5 and is retained between the cheek plate, which has a fold 8 which is wide enough to receive it, and the tire 1.

It should be understood that the inflation of each of the air bladders 6 and 7 (FIG. 2) will immobilize the tire 1 on each of the cheek plates 4 and 5, while the tread of said tire is stretched between the two cheek plates into a substantially planar surface.

Each of the perforated wheels thus constituted turns freely on the hollow shaft 9 (FIGS. 1 and 2), each wheel being mounted on a perforated casing 10 which carries, integral with it, between the two cheek plates 4 and 5, radial vanes 11 which divide the interior volume of the tire into as many sections as is necessary such that the elementary volumes thus defined by the interior of each wheel 1, which face one another on both sides of the vine, and are arranged to substantially coincide and to close in unison on one another, as shown in FIG. 1 with respect to volumes 12 and 13.

Figure 2:
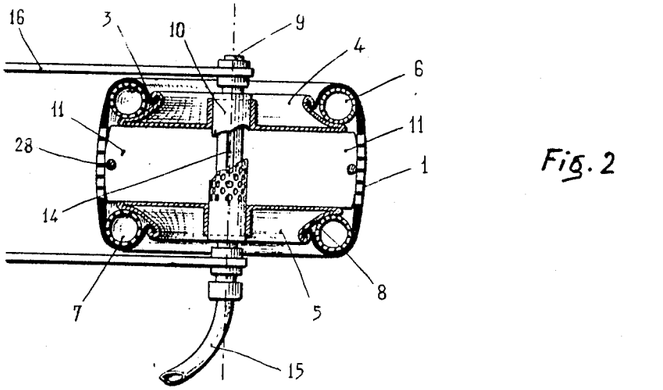
FIG. 2 is a schematic view in vertical cross-section of the same device.

The hollow shaft 9 comprises a single slit 14 arranged longitudinally along the surface which is arranged on the line connecting the centers of the two wheels. The slits 14 of each of the two wheels which face one another themselves face each other. The hollow shaft 9 is connected by the tube 15 to the reduced pressure reservoir (not shown) forming part of the vehicle on which the device of the invention is mounted, or placed under vacuum by an interposed pump of the type used for pumping marc.

It is thus understood that the vacuum will not exercise itself reciprocally, on the interior of the perforated wheels 1 facing one another, except at the level of the sectors which are tangent to one another, because they are the only ones to be in communication with the reduced pressure reservoir or in a relation with the pump across the slit 14 of the hollow shaft 9 of each of the wheels.

The vegetation and the fruits carried by the vine thus passed are pressed in this same zone under the effect of springs which have a tendency to maintain each of the wheels arranged on the same center line in contact, at the same time that they will be subjected to a reduced pressure exerting itself towards the interior of the said wheels. The juice and the grapes thus pressed will naturally penetrate into the interior of the perforations of the envelope 1 and will be aspirated across the sector across the corresponding sector 12 (FIG. 1) towards the perforated casing 10, from where they will be transferred across the slit 14 and the tube 15 to the reduced pressure reservoir (not shown).

Being thus received in this reservoir, they will be extracted from it when this reservoir is full by means of a pump of the type used to pump marc which the vehicle comprises on which is mounted the object of the present invention, such as a pulverization vehicle of known characteristics (not shown). This possibility of mounting the device which is the object of the invention on an apparatus which can be used during other cultivation periods of the year for another purpose constitutes a supplementary advantage of the said device.

Figure 3:
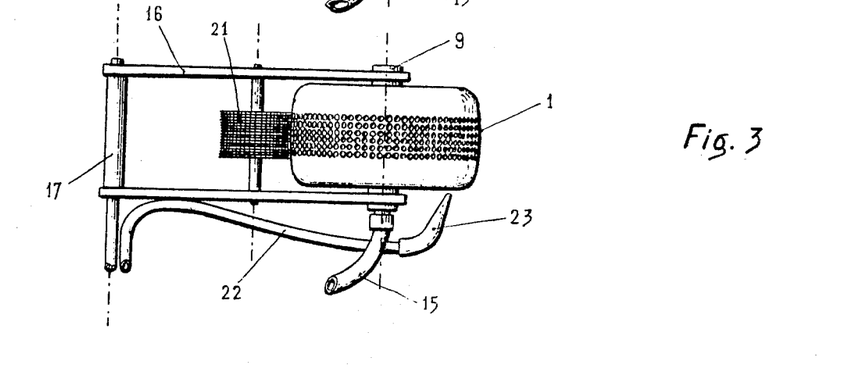
FIG. 3 is a schematic elevational view of the same device in operating position.
Figure 5:
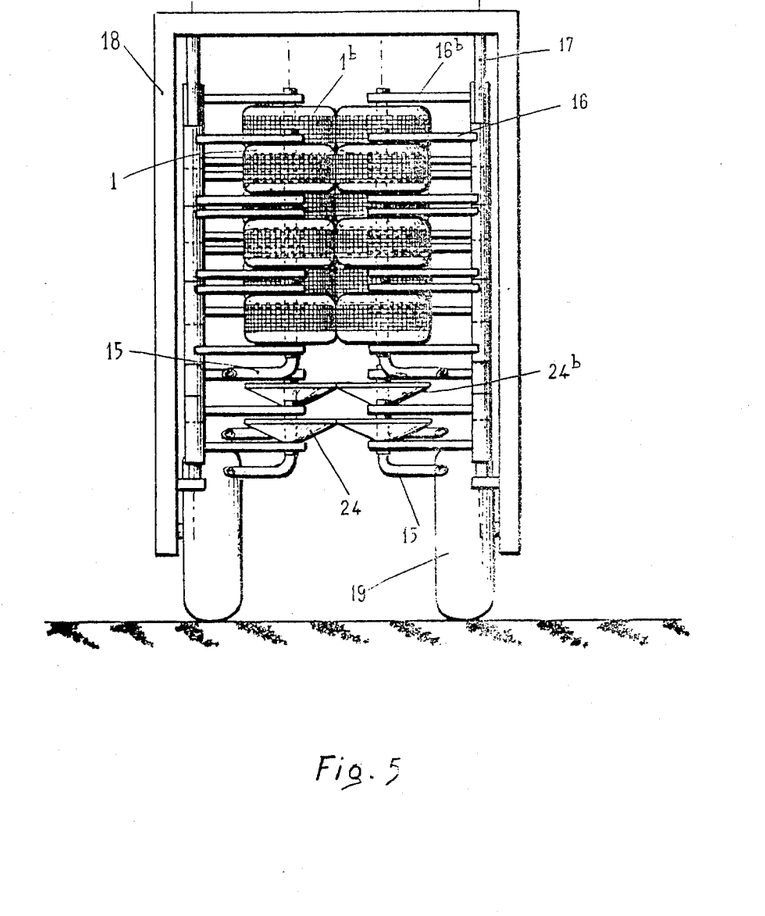
FIG. 5 is a schematic view of the same mounted vehicle, seen in elevational profile.
Figure 6:
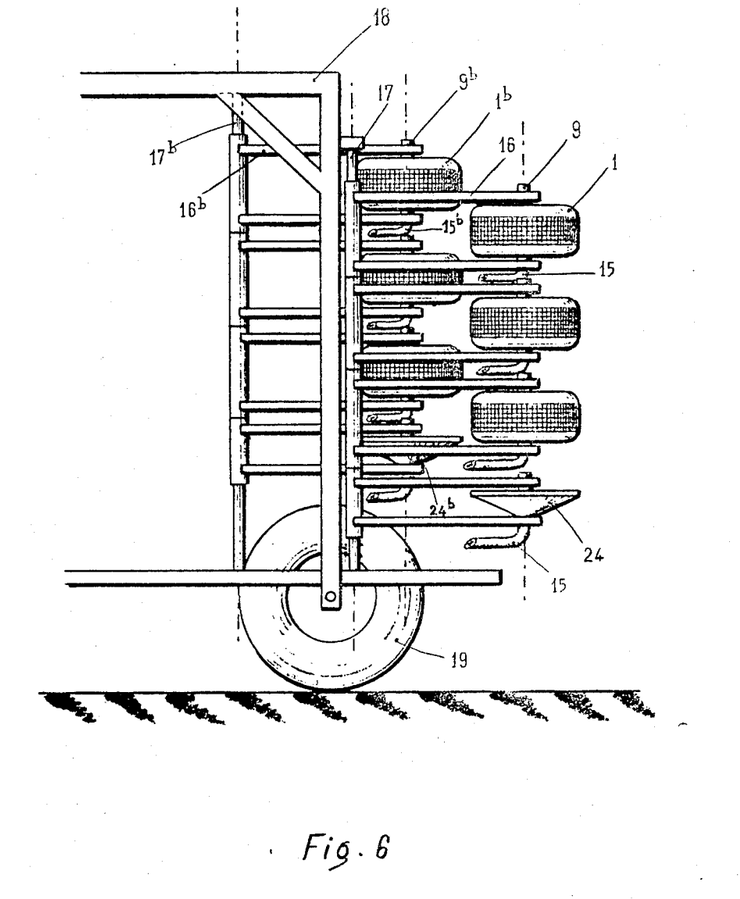
FIG. 6 is a schematic view of the same mounted vehicle, as seen in rear elevation.

According to FIG. 3 the wheel 1, the characteristic element of the device, is mounted on an arm 16 which is free to oscillate in the horizontal plane around the shaft 17 which is integral with the frame 18 (FIGS. 4, 5 and 6), which can be drawn by a tractor apparatus and which is carried by the wheels 19 whose position with respect to the frame is adjustable, so as to modify its height with respect to the ground.

Figure 4:
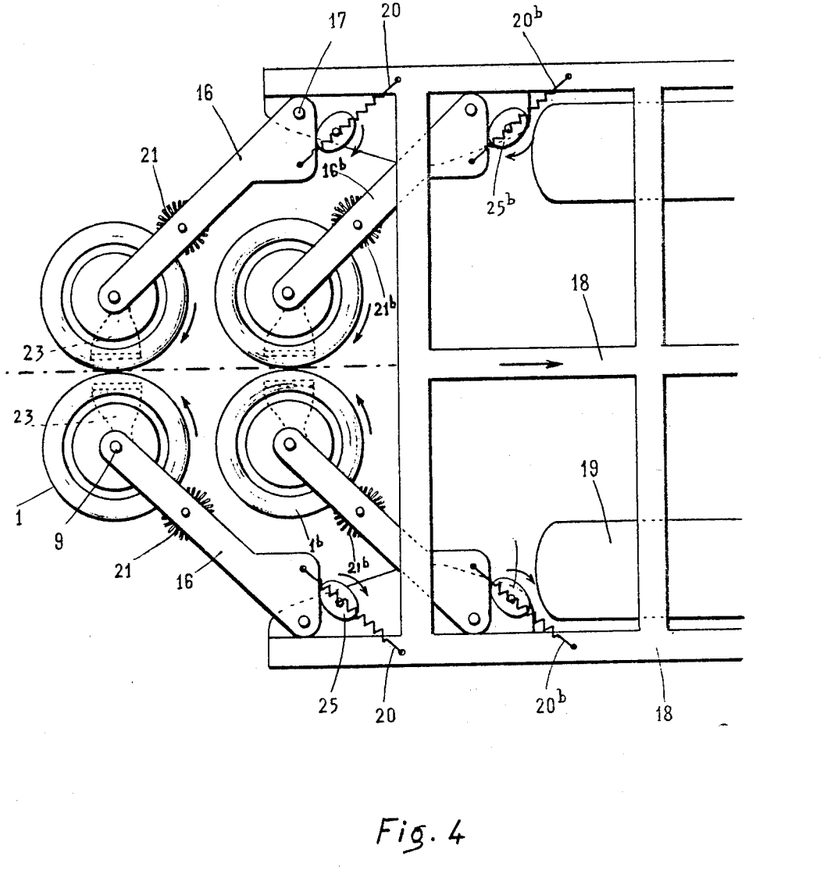
FIG. 4 is a schematic planar view of several harvesting elements mounted on a chassis according to one embodiment.

The contact of essential device 1, which may be considered as a "press-wheel" with the vegetation is obtained by means of springs 20 (FIG. 4). Reference numerals 1b, 9b, 16b, 17b, 20b, 21b, 24b, and 25b, as illustrated in FIG. 4, correspond to the similar reference numerals without the "b" as previously described, only referring to another series of wheels and supports. Accordingly, each of these individual elements will not be discussed in detail hereinafter, as their function is the same as that described above with respect to elements 1, 9, 16, 17, 20, 21, 24, and 25, respectively.

In order to assure cleaning of the perforations of the tread of the press-wheels 1 the oscillating chassis 16, which carries each press-wheel is provided with a circular spur wheel 21 which is rotatably driven by the wheel 1 itself, with which it is in permanent contact, the spurs of the said spur wheel being made out of a semi-rigid elastomeric material penetrating into each of the perforations to clean them.

Each oscillating chassis 16 also carries a tube 22 connected to the suction mouth of the ventilator not shown which creates the vacuum in the storage reservoir thus sending air under pressure to the external periphery of the press-wheel 1 across a nozzle 23 having a wing tip adjacent to the said periphery (FIGS. 3 and 4). This has as an object to prevent grape juice from flowing externally which can wet the surface of the wheel.

The device further comprises (FIG. 6) inverted domes 24 aligned with the press-wheels 1, at their base, whose purpose it is to receive juice which despite all precautions nevertheless escapes from the press-wheels.

The device forming the object of the invention which has been described, it is possible to vertically align several of the devices (FIGS. 4 and 5) which each abut an identical wheel arranged in the same horizontal plane carried by an oscillating chassis assembly 16 which cause, under the pressure of springs 20, a pincer effect between which the vegetation is taken.

Furthermore (FIGS. 5 and 6), the press-wheels 1, not being able to be arranged directly side by side one on the other or in the same vertical alignment, are provided on an alternative chassis arrangement 16b (FIGS. 4 and 6) which carries the press-wheels 1b which are arranged in horizontal planes corresponding to the intercalary zones existing between the press-wheels 1 in a manner so as to cover without interruption, during the advancement of the vehicle, the entire height of the vegetation being harvested, the two sets of successive wheels thus created having no contact between them.

Such a device may obviously be installed on a vehicle which will be drawn by an interlinear tractor as well as on a cross-over tractor which will cross over the rows of vines to be treated, in the same alignment where the press-wheels of the present device circulate.

Furthermore, so as to facilitate the removal of the grapes, whatever the vine plant being treated, even those where the connection of the berry to the stalk has the least fragility, each chassis 16 which carries a press-wheel is provided with an eccentric 25 (FIG. 4) attached onto the frame 18 and which, being supported on one of the arms of the chassis 16, causes the arm to oscillate.

These eccentrics 25 are adjusted in a manner such that they all turn synchronously, each of those which are situated on the same side of the apparatus with respect to its median longitudinal plane being adjusted in common phase, while those which are symmetrically arranged on the first with respect to this same plane are adjusted out of phase by 90 degrees with respect to the first, in a manner such that during the oscillation of the assembly of the press-wheels 1 caused by the rotation of these eccentrics, each one of the press-wheels 1 always remains in contact with its symmetric.

The device being thus constructed, it is noted that the device may be drawn by an automotive agricultural treatment vehicle for example, (which considerably reduces the investment involved in harvesting of the fruits) which additionally includes a fan of a given strength and a reservoir which can be placed under reduced pressure and which can be evacuated by means of an independent pump. The vehicle will be able to move in the rows of vines which it will cross, either by being directly drawn by a crossover device, or drawn on its sides by an interlinear apparatus.

Each vine plant will thus be passed along its entire height by each pair of press-wheels 1 which will press it as a function of the force applied by virtue of springs 20 and will eventually cause it to oscillate more or less rapidly without beating it, with respect to the median vertical plane by virtue of the rotation of the eccentrics 25. The grapes will thus be compressed by the perforated tread of the press-wheels and will thus be simultaneously burst and drawn across the perforations which it comprises by virtue of the vacuum which exists on the interior of the wheels. The juice and the pulps thus obtained will follow the path described above, across the perforated casing 10 and the slit 14 of the shaft which carries it to arrive at the storage container through the pipes 15.

It is very clear that such a device will collect the fruits but will not collect any leaves, nor stalks. This is because the perforated surface and the pressure of the wheels 1 is insufficient to allow them to enter, and because oscillation imparted to the vines by the eccentrics 25 is insufficient to tear off the leaves, which thus prevents any portions of the leaves from being introduced. It is the same for the stalks which will never be collected.

The harvest will thus be automatically cleaned and without any wastes which saves with respect to materials needed to sort and remove the stalks, leaves and vine shoots or twigs or stumps or any other wastes, which would generally contaminate the harvests captured by automation, which increases the value of the known material. It also makes it possible to save a substantial amount of energy which is generally necessitated by the pneumatic sorting apparatus which obviously provide a low energy yield.

A large energy savings is also realized by virtue of the fact that the press-wheels 1 do not have their own movement independent of their displacement with respect to the vegetation but instead have a rotation obtained spontaneously by the simple entrainment of these wheels on the vegetation which is freely encountered as they move along.

This absence of independent movement of the work elements and the absence of the beating of the vegetation, which is weakly shaken, also has the advantage of not causing the vegetation to suffer any damage itself, which assures its perenniality, none of the buds being deteriorated for future harvest.

Such a device thus has the advantage of producing a clean harvest, of not causing any damage to the vine and of saving energy by means of a simple, light apparatus which thus is easily maintained and which can be drawn by a polyvalent motor vehicle utilized under other circumstances for other tasks, which correspondingly reduces the necessary investment and increases profitability.

According to another embodiment, and so as to maximally reduce the losses of juice which might occur during the crushing of the grapes on the trunk between each of the sets of press-wheels, the said press-wheels, forming the object of the invention, may be mounted in pairs at the end of arms 26 (FIG. 7) which rotate in the vertical plane which is parallel to the row of vines being harvested. The axis of each press-wheel is thus oriented along a radius of a circle that the said wheels describe in the course of the rotation of the arms 26 which carry them. These arms 26, which can number 2, 4 or 6 pairs, are mechanically rotated in a continuous movement or in a pendulum movement around the horizontal shaft 27 carried by the frame of the apparatus and pass above the vegetation to be treated. Furthermore tubes 15 which extend over the arms 26 conduct the grapes and the juice harvested by each press-wheel towards the storage container. Each of the arms 26, which constitute the pairs centered on the shaft 27, pass on each side of the vegetation which is thus pressed according to the previously described principle between the press-wheels 1 arranged at the free end of each arm.

Figure 7:
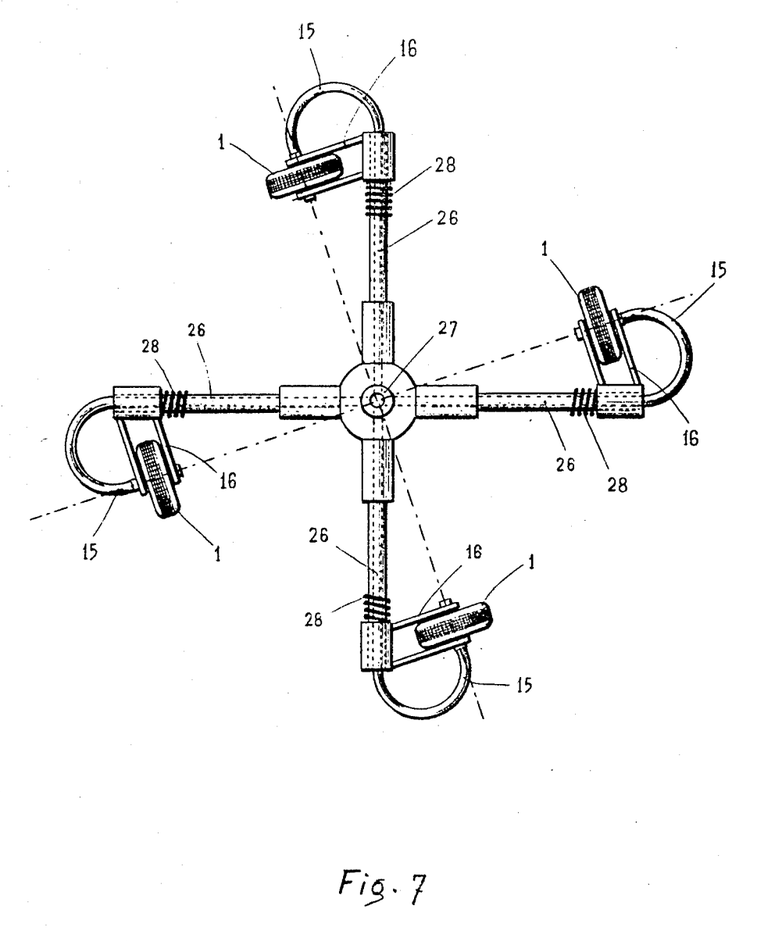
FIG. 7 is a schematic view of the same mounted vehicle on a rotatable chassis.

The torsion springs 28 assure reciprocal support of the press-wheels of each pair.

In this embodiment the speed of advancement of the tractor is adjusted in such manner that the distance along the ground covered by the engine during the time necessary for the succession to the same point of the vegetation of two pairs of press-wheels, in the course of the rotation of the rotor which carries them, is less than to the width of a press-wheel.

It is thus understood that if the distance covered by the tractor is one third, for example, of the width of a press-wheel during the time necessary for two pairs of wheels to reach the same point of the vegetation, each point of this vegetation will successively be pressed three times by three successive pairs.

It is thus observed that the several grapes which may have been able to escape the first passage will be aspirated in the course of the successive passages. This makes it possible also to recover by aspiration the juice which could previously have wet the leaves.

Also, according to another embodiment of the device itself, the device may be provided on the interior of its perforated wall and in contact with stiffener 28 which contributes to assure the planarity of the wall itself in a fashion so as to assure a greater surface of contact between the press-wheels of each pair.

It is obvious that the scope of the invention is not limited to the example or to the examples of the embodiments which have been described herein, and extends to all variations considered as equivalent, without going beyond the scope of the invention. Thus, by virtue of their simplicity, the devices described herein above may be mounted on apparatus treating several rows of vines at a time.

The present invention can be used for the harvest of fruits such as grapes or other similar berries.

I claim:

1. A device adapted to automatically harvest fruit during movement through vegetation containing said fruit, said device comprising:
   (a) two hollow volumes facing each other and maintained in contact with each other over an area by an adjustable elastic pressure for bursting said fruit being harvested, said hollow volumes including multiple perforations at the area of said contact which are large enough to permit passage of the largest fruit being harvested, said hollow volumes being defined by a material sufficiently flexible to be adjustably displaced within the vegetation through which said volumes are moved such that the portions of the vegetation carrying the fruit to be harvested will be successively introduced and elastically pressed between said perforated surfaces adjacent said contact area; and
   (b) means for creating suction for pulling said harvested fruit through said perforations into said hollow volumes and for conducting said harvest to a storage reservoir, wherein flexible portions of said hollow volumes are adapted to be displaced for bursting said fruit by moving said device through the vegetation being treated.

2. A device in accordance with claim 1 wherein each of said hollow volumes is perforated about its entire periphery and is freely rotatably moveable about a vertical axis, each of said volumes being carried by a chassis oscillating in a horizontal plane, a spring causing said oscillation for maintaining said contact area between said hollow volumes along said horizontal plane.

3. A device in accordance with claim 2 wherein said hollow volumes comprise perforated cylinders which face one another and are mounted upon a casing perforated in a fashion similar to the periphery of said volume, each of said casings freely turning about a hollow vertical shaft having a slit provided along its longitudinal surface and arranged in the plane containing the axes of said shafts, said slits facing one another and each of said hollow shafts connected to a storage reservoir by a tube adapted to conduct said harvested fruit from said casing to said storage reservoir.

4. A device in accordance with claim 3 wherein each of said cylinders is subjected to suction created by said suction creating means and is provided on its interior with radially extending partitions which are integral with said perforated casing, said partitions dividing said cylinder into a plurality of sections which are successively subjected to said suction as they move in front of the slit on said hollow shaft, the number of said sections being selected such that the angular opening between two adjacent sections taken along the outer periphery of said cylinders is substantially equal to the contact area of said two adjacent cylinders facing one another along said horizontal plane.

5. A device in accordance with claim 4 wherein each perforated cylinder includes an external wall which comprises a supple, elastomeric tire reinforced with fiber sheets, opposed portions of said tire being retained by cheek plates, said plates being integrally attached to said perforated casing, said tire being perforated along the level of its tread.

6. A device in accordance with claim 5 wherein said fiber sheets are metallic.

7. A device in accordance with claim 5 wherein said sheets are textiles.

8. A device in accordance with claim 5 wherein said cheek plates are positioned on opposed sides of said radially extending partitions and are integrally attached thereto, said cheek plates forming rims having peripheries which form a large throat portion for receiving a heel of said tire, each of said cheek plates including an elastic torus at said throat for maintaining a heel of said tire within said rim so as to stretch the perforated tread of said tire for increasing the surface contact area between said cylinders along the horizontal plane and simultaneously reduce the distance between the center of an arc formed by said tire when stretched and the chord forming said arc.

9. A device in accordance with claim 8 wherein each elastic torus comprises an inflatable air bladder serving as a stretcher when inflated by pressurized fluid.

10. A device in accordance with claim 9 further comprising a rigid element attached to the median portion of said wall portion of said perforated cylinder for improving the planarity of said wall portion.

11. A device in accordance with claim 10 wherein said oscillating chassis carrying each of said perforated cylinders includes a rotatable spur wheel, which includes a plurality of semi-rigid fingers freely turning about a vertical axis and which are in continuous contact with said cylinder for rotating said cylinder, said fingers penetrating into said perforations along said cylinder wall for cleaning said perforations.

12. A device in accordance with claim 11 wherein each of said cylinders is provided with a blower for blowing pressurized air, each of said blowers being in communication with a fan outlet, said blowers terminating at the lower portion of said cylinders in a wind-shaped jet for preventing the gravity downflow of liquid which would otherwise flow toward said cylinder wall perforations.

13. A device in accordance with claim 5 further comprising a first series of perforated rotatable cylinder pairs positioned on parallel vertical axes, said cylinder pairs situated on oscillating chassis for maintaining contact with the other cylinder in each pair along the horizontal plane containing each pair, each of said rotatable cylinders being biased by a spring supported on said device and each cylinder being connected by a flexible conduit to a reservoir which is subjected to a constant reduced pressure.

14. A device in accordance with claim 13 wherein said first series of cylinders are carried by a frame which also supports a second series of perforated cylinders identical to said first series of cylinders and occupying the same relative positions as the cylinders in said first series, said first and second series being separated by a sufficient distance to prevent contact between the cylinders of said series, the perforated cylinder pairs of said second series arranged along horizontal planes intermediate of the horizontal planes of each of the pairs of cylinders of said first series for assuring a substantially continuous application of pressure along the entire height of the vegetation being harvested during the relative displacement of said vegetation between said cylinder pairs.

15. A device in accordance with claim 14 wherein each of said series of perforated rotatable cylinders is generally vertical and includes a container at the base of said series which is also connected to said means for creating suction for receiving any juice, fruit or other material which escapes from said cylinders.

16. A device in accordance with claim 3 further comprising a plurality of pairs of perforated cylinders freely rotatable along axes integrally attached to the ends of arms which are radially mounted on a rotatable rotor turning within the plane of said vegetation being harvested, each of the axes of said cylinders being oriented along a radius of said rotor, said pairs of cylinders pressing the vegetation through which they pass while being rotated by said rotor, said device further comprising a tractor for advancing said cylinders, the speed of advancement of said tractor being adjustable such that the distance covered by the tractor during the period of time necessary for adjacent pairs of cylinders to reach the same position within the vegetation is equivalent to a sub-multiple of the width of said perforated tread of said cylinders.

17. A device in accordance with claim 16 wherein each of said cylinders comprises a press wheel mounted upon an axis oriented along the radius of said rotor and attached to secondary arms which are in turn attached to the arms of said rotor, a spiral ring coaxially positioned at the joints between said arms and being adapted to supply the necessary pressure between the press wheels of each of said pairs of press wheels.

18. A device in accordance with claim 2 wherein all of said oscillating chassis are biased by eccentrics which are adapted to oscillate said chassis along both sides of the vertical median plane of said series, said eccentrics being controlled synchronously during rotation of said cylinders, eccentrics positioned along one side of said device being in phase and eccentrics positioned on an opposite side of said device being out of phase by 90° with respect to the eccentrics on said one side.

19. A device in accordance with claim 1 wherein aid device is attached to a tractor which moves it through said vegetation, said hollow volumes comprising press wheels which rotate only by virtue of the movement of said tractor.

* * * * *

UNITED STATES PATENT AND TRADEMARK OFFICE
CERTIFICATE OF CORRECTION

PATENT NO. : 4,269,022

DATED : May 26, 1981

INVENTOR(S) : Albert ADAMS

It is certified that error appears in the above—identified patent and that said Letters Patent is hereby corrected as shown below:

Column 2, line 9, the illegible word before "height" should be --entire--.

Column 5, line 18, after "vehicle", --,-- should be inserted.

Claim 19, line 16, "aid" should be --said--.

Signed and Sealed this

Eighteenth Day of August 1981

[SEAL]

Attest:

Attesting Officer

GERALD J. MOSSINGHOFF

Commissioner of Patents and Trademarks